310-369 SR

XR 3,700,939

United States Patent

Abbott

[15] 3,700,939

[45] Oct. 24, 1972

[54] FERROELECTRIC CERAMIC STACK

[72] Inventor: Frank R. Abbott, San Diego, Calif.

[73] Assignee: The United States of America as represented by the Secretary of the Navy

[22] Filed: Sept. 10, 1971

[21] Appl. No.: 179,347

[52] U.S. Cl. ......................310/9.8, 310/9.6, 310/9.7

[51] Int. Cl. ..............................................H04r 17/00

[58] Field of Search..................310/9.1–9.4, 9.6–9.8

[56] References Cited

UNITED STATES PATENTS

| | | | |
|---|---|---|---|
| 3,068,446 | 12/1962 | Ehrlich et al. | 310/9.6 X |
| 3,043,967 | 7/1962 | Clearwaters | 310/9.6 X |
| 2,523,701 | 9/1950 | Kuehl | 310/9.7 X |
| 3,176,251 | 3/1965 | Kuenzig | 310/9.6 X |
| 3,185,870 | 5/1965 | Stoddard et al. | 310/9.4 |
| 2,559,494 | 7/1951 | Brown, Jr. | 310/9.4 |

*Primary Examiner*—J. D. Miller
*Assistant Examiner*—Mark O. Budd
*Attorney*—Richard S. Sciascia

[57] ABSTRACT

A unique coupling arrangement for joining the thin leaf conductors interposed between adjacent ones of a stack of ferroelectric elements functioning as an acoustic energy projecting transducer is provided. A separate resilient helical spring element is secured to each metalic conductor and has an orthogonally shaped portion to slidably contact one of two longitudinally extending bus bars sized to reach through the orthogonal portions. By coupling alternate ones of the helical springs to one of the bus bars and the other alternate ones of the helical springs to the other bus bar, the ferroelectric rings are connected electrically in parallel to provide an additive composite driving force for the transducer when a suitable driving field is impressed across the stack. Having the resilient, orthogonally shaped helical springs mounted in slidable contact with the bus bars allows responsive reciprocal travel by the stack yet does not permit the electrical interconnections between the bus bars and their conductors to be torn apart as is the case with rigidly soldered connections in conventional transducers.

4 Claims, 3 Drawing Figures

PATENTED OCT 24 1972 3,700,939

*INVENTOR.*
FRANK R. ABBOTT

*BY*
THOMAS GLENN KEOUGH
ERVIN F. JOHNSTON
ATTORNEYS

FERROELECTRIC CERAMIC STACK

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Contemporary transducer design has established that a stack suitably polarized ferroelectric elements electrically coupled in parallel produce an additive reciprocal displacement which is the sum of their aggregate deformations. The ferroelectric stacks were fabricated having thin films or sheets of metalic conductors interposed between the ferroelectric elements with a pair of longitudinally reaching bus bars appropriately soldered to feed the driving potentials to the stack. Having the transducer so connected tended to impair the reliability of the transducer since when high driving potentials were applied, the rigid points of electrical connection between the bus bars and the conductors would be torn apart. This failure imposed power limitations on the stacks, especially where high energy, low frequencies were to be projected.

SUMMARY OF THE INVENTION

The present invention is directed to providing an improvement in acoustic energy projector-transducers employing a ferroelectric stack having adjacent elements separated by thin metal conductors. One of a plurality of resilient helical spring elements is secured to a separate metal conductor and each is shaped with an orthogonally reaching portion having a diameter sized to slidably engage one of two longitudinally extending bus bars. Being so connected prevents failure producing tensile forces created as the stack undergoes responsive bidirectional excursions from tearing apart the points of electrical interconnection between the plurality of helical spring elements and their individually interconnected conductors.

A prime object of the invention is to provide a more reliable transducer capable of being driven at higher power levels.

Another object of the invention is to provide an electrical interconnection minimizing the possibility of failure.

Still another object of the invention is to provide a transducer employing a ferroelectric stack as its driving element capable of being driven at a much higher energy level by eliminating tensile stress areas between points of electrical interconnection.

These and other objects of the invention will become more readily apparent from the ensuing specification when taken with the drawings.

DESCRIPTION OF THE PREFERRED EMBODIMENT

Figure 1:
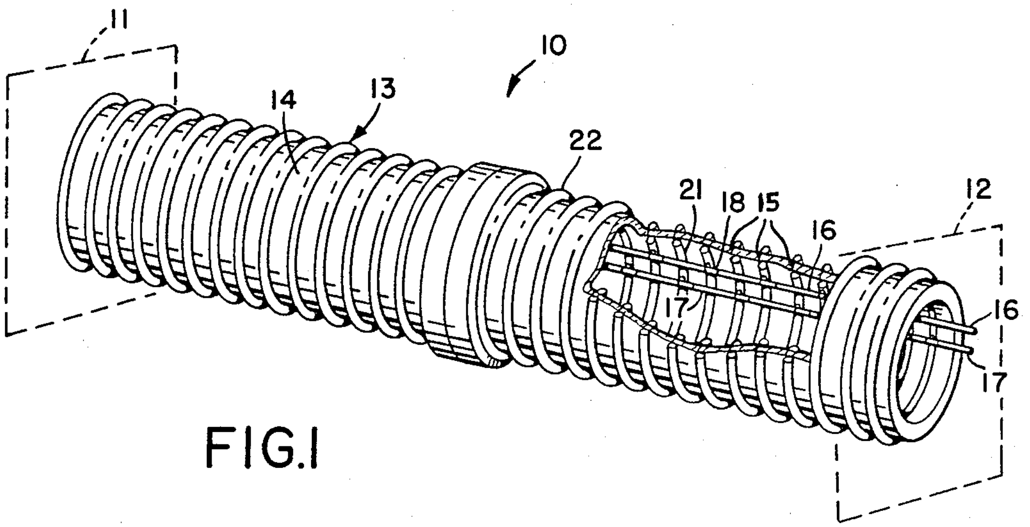
FIG. 1 is an isometric view, partially in section, of the preferred embodiment of the invention.

Referring in particular to FIG. 1 of the drawings, a typical electro-acoustical transducer 10 is shown schematically depicted having, for example, a pair of acoustic energy radiating surfaces 11 and 12, shown in phantom, mounted on opposite axial extremes of a ferroelectric stack 13.

In accordance with contemporary design criteria, the ferroelectric stack is formed of a plurality of ring shaped ferroelectric elements 14 sandwiching thin metal conductors 15 between adjacent ones. The metal conductors, optionally, are metal leaves bonded in place or thin metal films deposited on the ferroelectric rings and serve to impress electric fields across the rings. In the present embodiment, individual ones of the ferroelectric rings were placed in a high intensity electric field running in a direction substantially parallel to their axis. When a driving potential is fed to the metal conductors, the polarized ferroelectric rings impart a responsive bidirectional axial deformation. The deformation of individual rings adds together throughout the length of the stack, when all the conductors are connected in parallel, to drive the radiating surface a considerable distance.

Usually a flexible small diameter wire is joined to alternate conductors when the benefits of parallelly connecting a ferroelectric stack are desired. Unfortunately, when high driving potentials are fed to the stack, these small diameter wires create excessive losses. In the present invention connecting alternate ones of the metal conductors in parallel throughout the length of the entire stack to a first heavy duty bus bar 16 and the other group of alternate ones of the metal conductors to a similar bus bar 17 avoids loss problems when high driving potentials are applied. However, when a transducer is modified to include these heavy-duty, relatively inflexible bus bars, a design problem arises where points of electrical interconnection must be made.

Rigid, soldered connections, only nominally successful in high energy, wire-connected transducers, have largely proven to be unsatisfactory. The soldered connections inherently possess internal stresses due to the soldering operation and when the stack is driven at high levels the combined forces tend to tear apart portions of the stack inoperative with subsequent degradation of the projected signal and internal losses.

Elimination of the failure inducing tensile forces is ensured by including a resilient helical spring 18 soldered to each of the metal conductors. In an alternate configuration, the spring is shaped in a pencil clip like fashion to clamp onto the bus bars to link them to the metal conductors. The springs, fabricated from a material possessing acceptable electrical conductive properties, are shaped with an orthogonally extending portion 18a having a diameter appropriately sized to slidably engage one of the bus bars 16 or 17. By simply inserting one or the other of the bus bars through the orthogonally bent portion enough frictional contact is made to provide a suitable electrical coupling. Optionally, the extreme extension of the orthogonally bent portion is soldered onto its respectively associated bus bar to further ensure a more reliable electrical coupling. In either event, the inherent resilience of the spring elastically yields to the composite deformation of the ferroelectric stack and stress points are not created at the junctures between the bus bars and the metal conductors.

Figure 3:
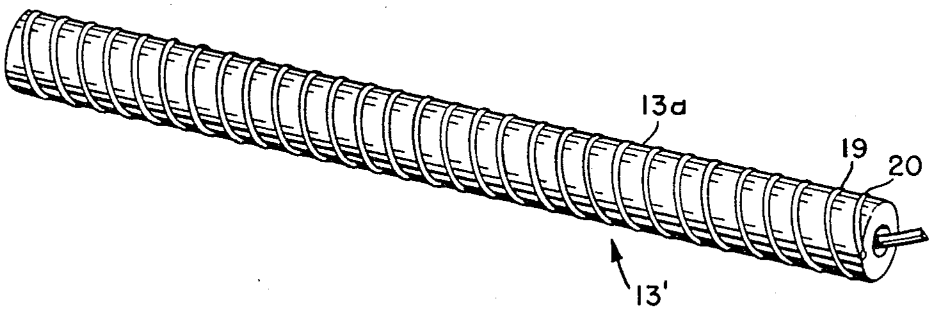
FIG. 3 is an isometric depiction of a variation of the preferred embodiment.
Figure 2:
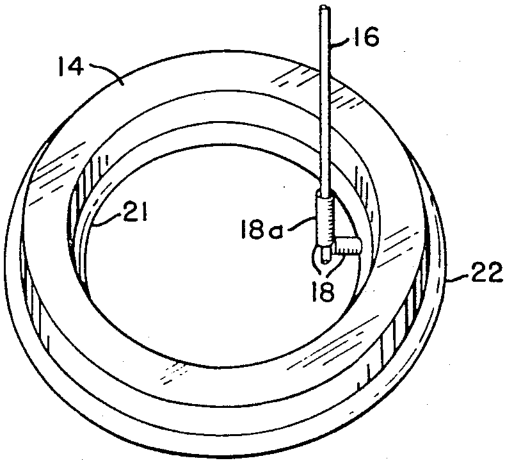
FIG. 2 is an isometric view of a detail of the preferred embodiment.

In an alternate embodiment of FIG. 3, a pair of elongate helical springs 19 and 20 are helically wound about the outer surface of a ferroelectric stack 13' having a helically grooved boot 13*a* for accommodating the springs. Each of the springs are directly soldered onto alternate ones of the metal conductors in the electrically parallel connection outlined above. Similarly to the helical spring-bus bar interconnection, the elongate helical springs 19 and 20 are capable of flexure and are not susceptable to fatique fracture as are thin foil tabs connections normally provided in conventional transducers.

A further advantage of including the bus bar-helical spring combinations, or the elongate helical springs by themselves, is that the arcing caused by corona concentrations, created when excessive driving potentials are applied are less prone to melt or separate the electrical juncture points.

Since a transducer employing a ferroelectric stack, as modified by the present invention, is capable of operating at higher driving potentials, internal and external corona rings 21 and 22 are included to dissipate electric field concentrations at the inner and outer rims of the metal conductors. The possibility of corona and arcing thusly is minimized to eliminate consequent damage to the transducer.

Obviously, many modifications and variations of the present invention are possible in the light of the above teachings, and, it is therefore understood that within the scope of the disclosed inventive concept, the invention may be practiced otherwise than specifically described.

What is claimed is:

1. In a transducer including a stack of ferroelectric rings polarized for axial deformation having metal conductors interposed between adjacent rings for impressing electric fields to impart representative proportional deformation, an improvement therefore is provided comprising:

a first bus element longitudinally extending the length of said stack;

a second bus element longitudinally extending the length of said stack; and a least one resilient conductor member secured to each said metal conductor and formed for making a slidable connection to one of the two bus elements for eliminating failure producing tensile stresses at the points of electrical interconnection.

2. A transducer according to claim 1 in which said resilient conductor is a helical spring having a portion of its length orthogonally shaped and being sized to slidably accommodate a bus element making said slidable connection.

3. A transducer according to claim 1 further including:

corona rings carried on the inner rim of each of said metalic sheets and their outer rims for minimizing corona.

4. In a transducer including a stack of ferroelectric rings polarized for axial deformation having metal conductors interposed between adjacent rings for impressing electrical fields to impart representative proportional deformation an improvement therefor is provided comprising:

a first helical spring helically wound on the outer surface of said stack longitudinally extending the length of said stack having portions making resilient contact with alternate ones of said conductors; and a second helical spring helically wound on the outer surface of said stack longitudinally extending the length of said stack having portions making resilient contact with alternate ones of said conductors, said first helical spring and said second helical spring being so connected for eliminating failure-producing tensile stresses at the points of electrical interconnection with the conductors.

* * * * *